United States Patent [19]

Lederman

[11] Patent Number: 5,458,352
[45] Date of Patent: Oct. 17, 1995

[54] COMBINED VEHICLE SUSPENSION AND WHEEL BEARING WITH IMPROVED MANUFACTURE

[75] Inventor: Frederick E. Lederman, Sandusky, Ohio

[73] Assignee: General Motors Corporation, Detroit, Mich.

[21] Appl. No.: 151,660

[22] Filed: Nov. 15, 1993

[51] Int. Cl.⁶ .............................. B62D 7/18; F16C 19/08
[52] U.S. Cl. .......................... 280/96.1; 384/499; 384/544
[58] Field of Search ........................... 280/93, 96.1, 660; 384/499, 505, 544; 301/124.1, 126, 131

[56] References Cited

U.S. PATENT DOCUMENTS

| | | | |
|---|---|---|---|
| 2,631,865 | 3/1953 | Hoffman | 280/96.1 |
| 4,179,167 | 12/1979 | Lura et al. | 308/189 |
| 4,504,099 | 3/1985 | Miki et al. | 280/96.1 |
| 4,729,674 | 3/1988 | Siebert et al. | 384/505 |
| 4,878,683 | 11/1989 | Dever | 280/96.1 |
| 5,226,737 | 7/1993 | Sandy, Jr. | 384/544 |

OTHER PUBLICATIONS

U.S. patent application Ser. No. 08/072,378 filed Jun. 7, 1993.

Primary Examiner—Mitchell J. Hill
Assistant Examiner—Paul N. Dickson
Attorney, Agent, or Firm—Patrick M. Griffin

[57] ABSTRACT

A combined steering knuckle and wheel ball bearing assembly has a double row, externally convergent design with a pair of separate, outer bearing races and inner pathways integrally ground into a rotating spindle. The outer races are assembled to the steering knuckle in such a way as to create a hub that is effectively integrated to the knuckle, but without requiring a complexly shaped knuckle. The knuckle has a central opening defined by a simple cylindrical edge and two bordering annular faces, all of which have clear access to be accurately machined. With the spindle, one ball row and one outer race in place, the other outer race can slide into the knuckle far enough to create a large enough radial clearance to load in the other ball row. Then, the remaining outer race is pulled back and locked in place by C shaped rings pressed between it and one face of the knuckle.

3 Claims, 6 Drawing Sheets

COMBINED VEHICLE SUSPENSION AND WHEEL BEARING WITH IMPROVED MANUFACTURE

This invention relates to vehicle wheel bearings in general, and specifically to a combined wheel bearing and suspension member with a simplified and improved manufacture and assembly.

BACKGROUND OF THE INVENTION

Designers and assemblers of radial ball bearings have always faced the dilemma that, in the completed bearing, the radial clearance between the ball pathways of the races is less that the diameter of the bearing balls. In order to assemble the balls, therefore, some means is necessary to temporarily, or locally, enlarge the radial clearance.

Conventionally, this has been done in one of several ways. One is the familiar Conrad technique in which the races are eccentrically displaced, and the balls pushed through the localized area of larger clearance. Then, the races are moved back to a concentric orientation. This has the advantage that the ball pathways are completely integral to the races, with continuous, uninterrupted surfaces, but there is a substantial limit on the number of balls that can be installed. Another technique is to cut a localized loading slot into the ball pathway, which is somehow plugged or filled after the balls are loaded in. This allows a higher ball count than the Conrad technique, but leaves a permanent physical interruption and stress riser in the pathway.

Since load capacity and ball count generally go hand in hand, and since both load capacity and axle stiffness are critical in vehicle wheel bearings, practical designs for wheel bearings are almost always double row angular contact ball bearings. The larger total number of balls gives higher load capacity, and the axial separation or "straddle" of the two rows gives axle stiffness. In this type of bearing, at least one pair of pathways, the inner or the outer pair, or sometimes both pairs, do not wrap both sides of the ball, as in a full contact radial bearing. Instead, the pathways wrap only diagonally opposed sides of the balls in each row, creating imaginary "contact cones". These cones may diverge, and so not intersect externally of the bearing, or converge, and thereby intersect externally of the bearing. It is generally desirable for loading and handling considerations to have a convergent wheel bearing design. When building up the bearing, it is a simple matter to get a high ball count in the ball row that is first installed, since there are no obstructions at that point in the assembly process. In installing the last ball row, however, the same problem of ball access is faced as with a single row bearing, since the inner and outer races (called spindle and hub) are then both in place. The Conrad technique is obviously more difficult to apply in the double row application, though not impossible, but generally does not give a high enough ball count. The loading groove technique is unacceptable because of the stress riser. Therefore, what has generally been done is to provide an entirely separate race piece for the last ball row, which gives clear, unobstructed ball loading access. The separate race piece is then locked axially in place by a control ring, which also determines the ball preload. The patent covering this design and technique is U.S. Pat. No. 4,179,167 to Lura, co assigned.

What is not articulated in the Lura patent, but what is obvious with some analysis, is that the technique disclosed there will work only in the case of a convergent double row design with a separable inner pathway, or a divergent design with a separable outer pathway. The technique will not work in the case of either a convergent design with separable outer pathway, or a divergent design with a separable inner pathway. This is because, in those two cases, the separable piece would have to make rolling contact behind the last installed ball row, and would be too thick to be capable of being pushed axially through the available radial clearance. While divergent wheel bearing designs are generally not desirable per se, a convergent design with a separable outer pathway would have some advantages. The outer pathway is larger in diameter than the inner, and can take more load. In the case of live spindle wheel bearing, that is, one in which the wheel is mounted to a rotating spindle, it would be an advantage for the separable piece to be fixed to the outer, stationary hub. Co assigned U.S. patent application Ser. No. 08/072,378, filed Jun. 7, 1993, discloses a novel design that does allow a convergent, separable outer pathway wheel bearing to be assembled. The separable outer race is designed to be pushed into the hub first, before the second ball row is installed, and retracted to an assembly position that opens up sufficient ball loading clearance. The outer race is then pulled back and locked in place to the stationary hub by a control ring, the thickness of which sets the ball preload.

Another consideration faced by vehicle wheel bearing designers is the pressure to continually simplify designs in terms of numbers of parts and package size. A trend has been to integrate more and more parts together, so that the bearing ball pathways become integral parts of the wheel spindle and hub. A downside of this trend is that bearing pathways require very high quality steel, more so than would be absolutely required for other parts of the wheel spindle and hub. The Lura patent takes this integration about as far as it has been commercially practicable to do. The pathways are integral to the hub, but the hub itself is separately bolted to the suspension, rather than being integral to the suspension. It is bolted to the outboard side of the suspension member, meaning that the bearing has to fit into whatever axial space is available between the suspension member and the wheel flange, which limits the width of ball row straddle available. The next desirable step in integration would be to integrate the outer wheel bearing hub with the suspension member, rather than separately bolting it on. In the case of a front suspension, this would involve integrating the hub and outer pathways to the steering knuckle, which is a very large piece, and would be prohibitively expensive if it were made entirely of bearing quality steel. Therefore, proposals for integration of hub and steering knuckle typically use separable races to provide the actual pathways. An example may be seen in FIG. 6 of U.S. Pat. No. 2,631,865 to Hoffman. The steering knuckle and hub are integral and compact, but integrating the hub makes the steering knuckle a much more complex part. Furthermore, the hub surfaces against which the inserts are fitted are fairly deep inside the hub, and not easily accessible for precision grinding. Consequently, the design is not particularly practical, and has not found commercial acceptance.

SUMMARY OF THE INVENTION

The invention combines a vehicle wheel bearing with a front suspension steering knuckle in a design that is practical to machine and assemble. Elements of the assembly technique disclosed in the above noted patent application are incorporated. The resulting package is more compact than a conventional design in which the hub is bolted to the suspension. The wheel bearing hub is not integral to the suspension per se, but it is effectively combined thereto to give a unitary assembly that would not require any installation of the wheel bearing beyond installation of the steering knuckle itself.

In the embodiment disclosed, the steering knuckle has a central opening that is specially sized and ground to accommodate the particular bearing design. The central opening is cylindrical, bordered by parallel, first and second annular faces, and all surfaces are unobstructed, accessible, and easily machined. The bearing includes a conventional live spindle into which are ground first and second identical inner ball pathways. A first and second row of same size balls make rolling contact with the inner pathways. There is no outer hub as such. Instead, separate, first and second outer bearing races are provided which are adapted to be assembled to the steering knuckle. The first bearing race is secured to the first steering knuckle face, and has an angular contact outer pathway that contacts the first ball row, diagonally opposed to the first inner pathway. The second outer race also has an angular contact outer pathway, which contacts the second ball row when it is in a fully installed position. The second outer race also has a shoulder that is spaced away from the second steering knuckle face with a predetermined axial clearance, when its pathway is in rolling contact with the second ball row. It also has a cylindrical outer surface, which is sized to slide within the steering knuckle opening. A pair of C shaped control rings is provided, each of which has a diameter equal to the second race shoulder, and a thickness equal to the axial shoulder clearance.

The bearing is built up by first installing the first ball row and first outer pathway, for which there are no obstructions. Next, the second outer race is pushed into the steering knuckle opening, toward the second face, all the way to its assembly position. This moves the second outer pathway axially inboard of the second inner pathway far enough to open up a total clearance large enough to allow the second ball row to be installed. Finally, the second outer race is pulled back to its fully installed position, and the control rings are inserted to lock it in place. An outer hub is effectively created by the two outer races, a hub that is fixed to the steering knuckle in a compact package, but which is simple and cost effective to manufacture and assemble.

DESCRIPTION OF THE PREFERRED EMBODIMENT

These and other objects and features of the invention will appear from the following written description, and from the drawings, in which.

Figure 1:
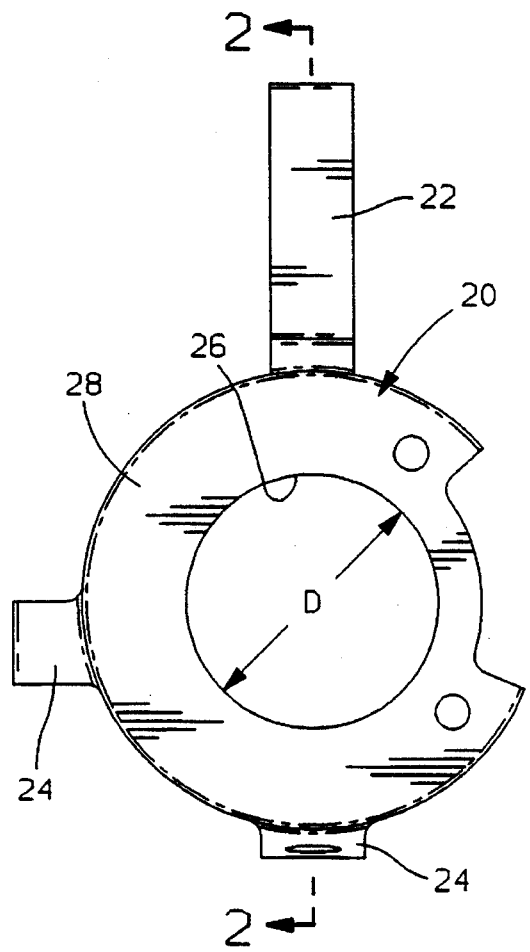
FIG. 1 is an axial view of the outboard, wheel side of a steering knuckle.
Figure 2:
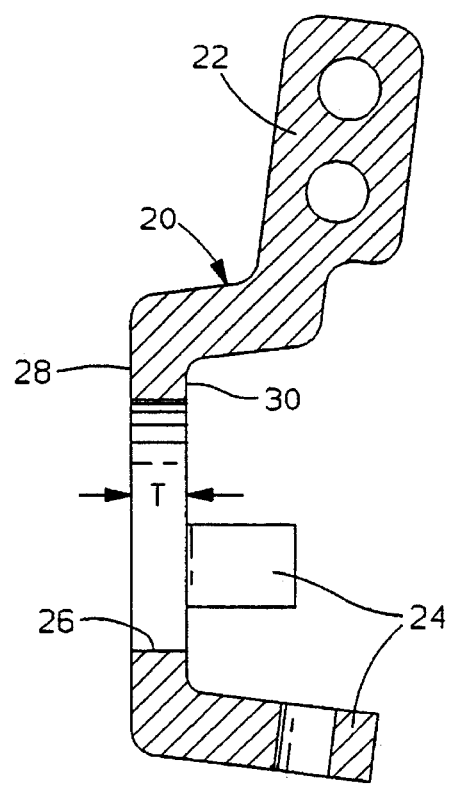
FIG. 2 is a cross sectional view of the steering knuckle taken along the line 2—2 of FIG. 1.

Referring first to FIGS. 1 and 2, a steering knuckle indicated generally at 20 is a steel forging which has the conventional peripheral elements of strut assembly hanger 22 and ball joint attachments 24. It also has a central cylindrical opening 26 of diameter D bordered by a first, outboard (or wheel side) annular face 28 and a second, inboard annular face 30. The annular faces 28 and 30 are parallel, and axially separated by a distance T that is substantially less than the ball row straddle S that is desired for the bearing, described below. As such, opening 26 is far too axially shallow to serve as a bearing hub by itself. The annular faces 28 and 30 are basically identical, but are numbered differently in the interest of better orienting other structure and for clear description of the assembly sequence. The most important feature of the central opening 26 is that it is simply shaped, not axially deep, and the annular faces 28 and 30 bordering it are all easily accessible and can be accurately machined. The annular faces 28 and 30 are both unobstructed, by which it is meant that they are not radially overlapped by, or axially inset from, or near any other structural surfaces that would interfere with their machining. While outboard face 28 is larger in surface area than 30, only as much of either face as will abut other structure described below needs to be precision ground. Theoretically, that could be only a very narrow annular area right at the juncture of each face 28 and 30 with cylindrical opening 26. As a practical matter, however, it would likely be easier to machine off the whole area of outboard face 28 flat and smooth, and most or all of inboard face 30. This removes forging scale, and leaves a smoother surface that makes later steps in the assembly process easier, as will appear below.

Figure 3:
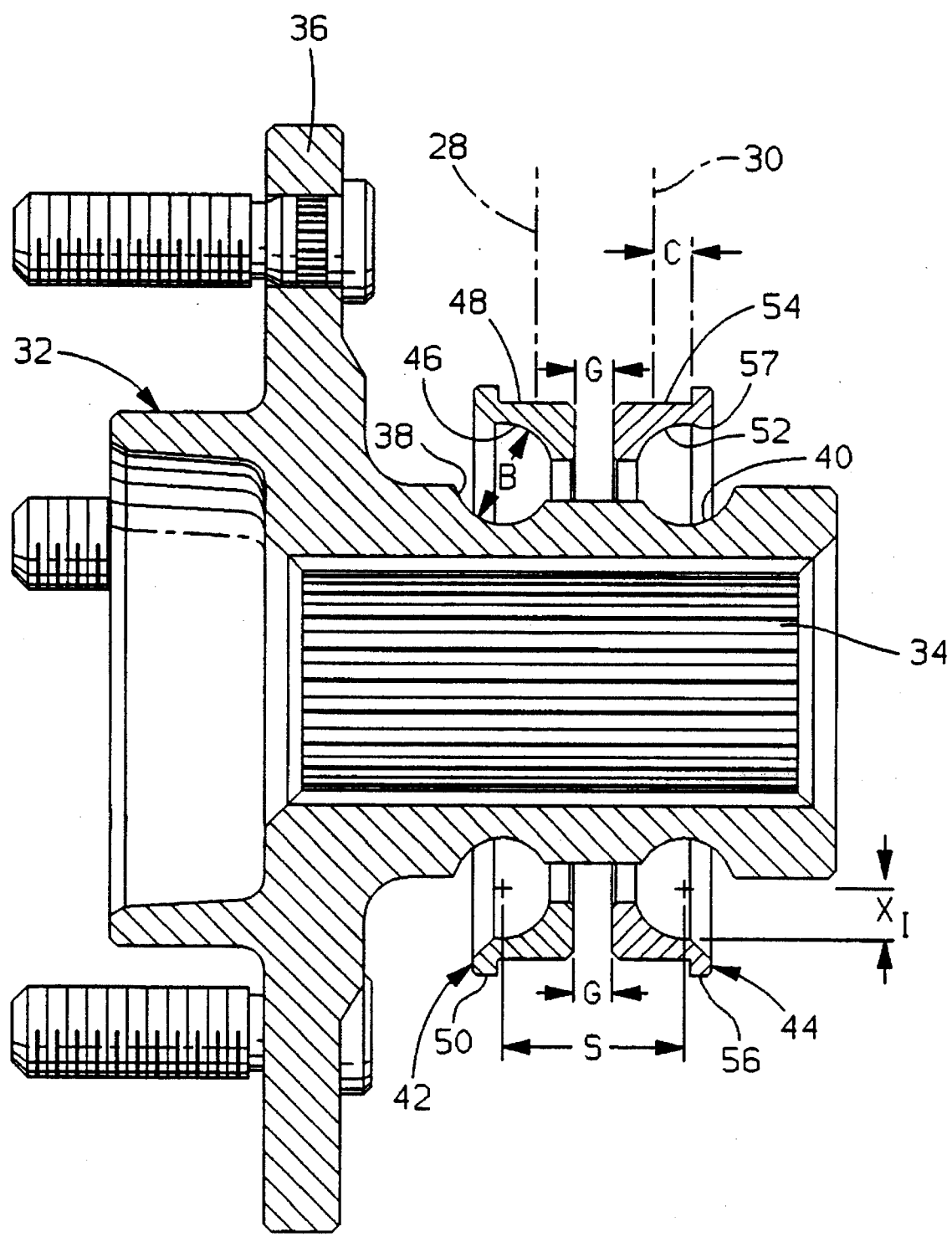
FIG. 3 is a cross section of a wheel spindle and the two races alone, shown in there installed position.

Referring next to FIG. 3, the wheel bearing portion of the combined assembly includes a central wheel spindle, indicated generally at 32. Spindle 32 is very like that currently used commercially, and is a driven or powered unit, recognizable by its splined central sleeve 34. It also has a integral wheel flange 36 on its outboard side. Where wheel spindle 32 differs from current units in that it's inner ball pathways are both ground totally integral to it, with no separable inboard race piece. Specifically, these are an outboard inner pathway 38 and inboard inner pathway 40, which are mirror images of one another. Each inner pathway 38 and 40 is an angular contact pathway, although it appears to the eye to be a full pathway, and is the externally convergent type, meaning that only the outer half of each is precision ground to actually contact a ball row. Unlike the commercially available unit, spindle 32 does not have a hub assembled to it to form a bolt on wheel bearing unit per se. Instead, a pair of outer bearing races, described next, effectively provide a hub, when installed as described below.

Figure 4:
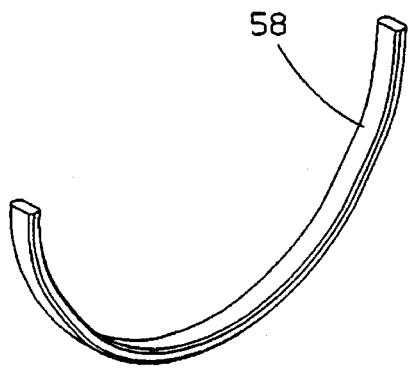
FIG. 4 is a perspective view of one control ring.

Still referring to FIG. 3 and 4, a first, outboard outer race 42 and a second, inboard outer race 44 are identical in size, shape and material, but are numbered differently so as to indicate their differing location and orientation. The outer races 42 and 44 are shown disembodied, but in their ultimate assembly position, so as to better illustrate certain dimensions, clearances, and structural relationships. Outboard race 42 has an angular contact pathway 46 diagonally opposed to the outboard inner pathway 38. The diagonal spacing between the pathways 38 and 46 is indicated at B, which also illustrates that the contact cone is of the externally convergent type, as described above. The outer surface 48 of race 42 is cylindrical, and has a diameter close to D, but still small enough to be able to slide within steering knuckle opening 26 without a great deal of resistance. An annular shoulder 50 extends radially out from cylindrical surface 48 far enough to be able to solidly abut the outboard annular face 28 of knuckle opening 26. Inboard outer race 44 also has an angular contact pathway 52 opposed to inboard inner pathway 40, a cylindrical outer surface 54, and shoulder 56. The final assembly position of the inboard steering knuckle face 30 is indicated by a dotted line, so as to illustrate an axial clearance C from shoulder 56. The same clearance would exist relative to shoulder 50 and outboard annular face 28, because of the fact that the outer races 42 and 44 are identical, but this is not separately illustrated. It will be noted that the terminal, outermost edge of outboard outer race pathway 52, indicated at 57, lies about axially midway between the bottom dead center of, and the outermost edge of, inboard inner pathway 40. Terminal edge 57 is also chamfered slightly. As a result of its axial location in the fully installed position, the radial clearance $X_I$ between the outer race 44 and spindle 32 is less than the ball diameter B, but not as small as it would be if the edge 57 extended axially farther out, beyond the outermost edge of inner pathway 40, and out over the uninterrupted outer surface of sleeve 34. So long as $X_I$ is significantly less than B, it is small enough. The straddle S between the ball center positions is substantially greater than T. Also, there is a significant gap G between the outer races 42 and 44, in their installed positions, which is deliberately made equal to or greater than C, and which plays a part in the ultimate assembly process. A pair of C shaped control rings 58 each has an axial thickness equal to C, a radial thickness substantially equal to the radial thickness of either shoulder 50 or 56, and an inner diameter substantially equal to either outer race surface 48 or 54. Two pairs of control rings 58 are used for each unit. The components described above cooperate in the step by step assembly process described next.

Figure 6:
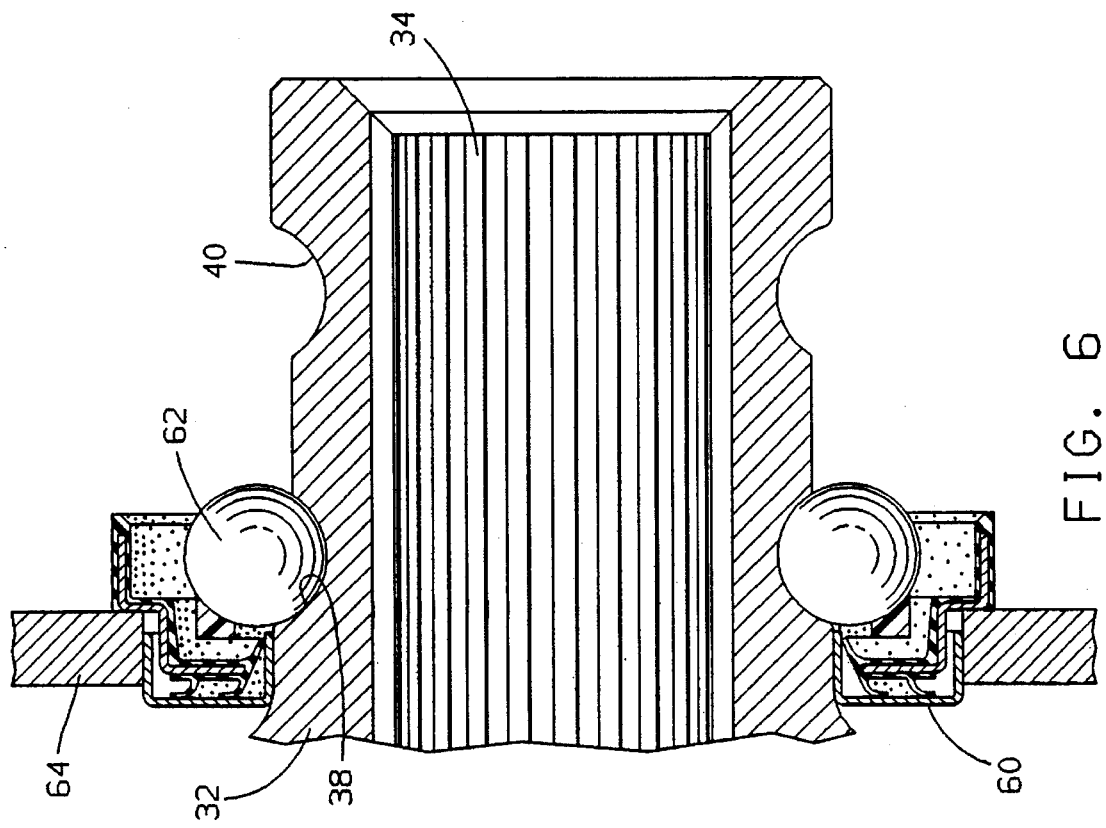
FIG. 6 shows the second step.
Figure 5:
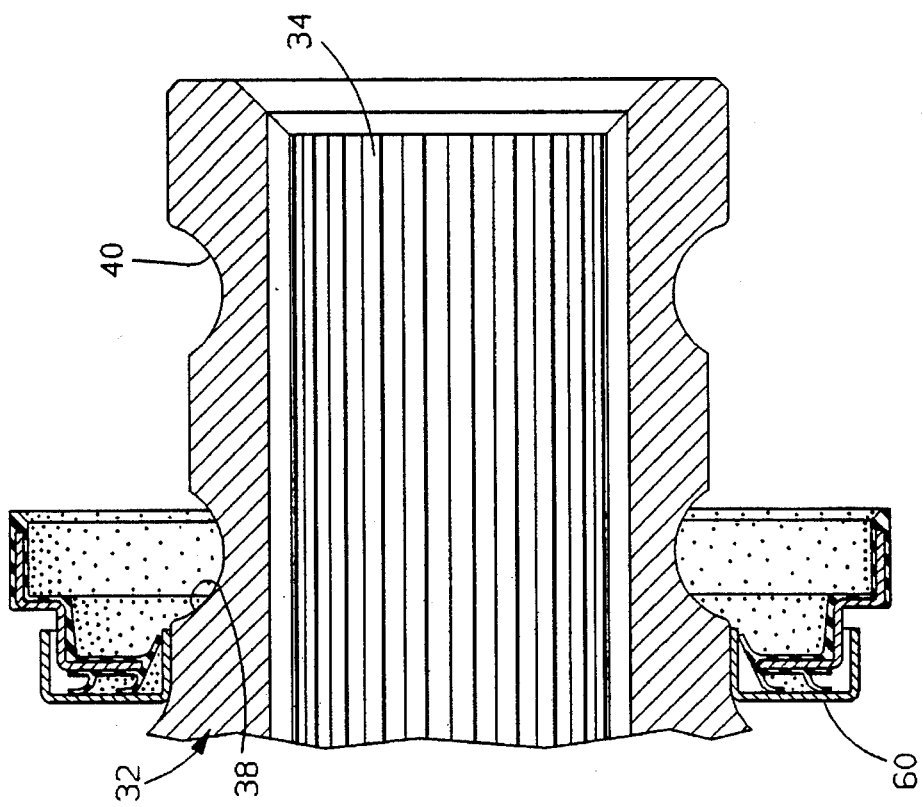
FIG. 5 shows the first step in the assembly process.

Referring next to FIGS. 5 and 6, the first step in the assembly process is to place an outboard grease seal 60 over spindle 32. Next, a caged outboard ball row 62 is placed on outboard inner pathway 38. The ball diameter of the outboard ball row 62 is equal to B, and there are no barriers to its installation. Spindle 32 is shown in a horizontal orientation. In actual fact, it would likely be placed vertically in a jig or holder, with wheel flange 36 down. Next, a support 64 is placed behind outboard seal 60 before subsequent assembly steps are carried out. Support 64, which would consist of two C shaped blocks clamped together, acts to absorb the downward pressing force of later assembly steps, so that the positions of outboard seal 60 and outboard ball row 62 are not disturbed.

Figure 8:
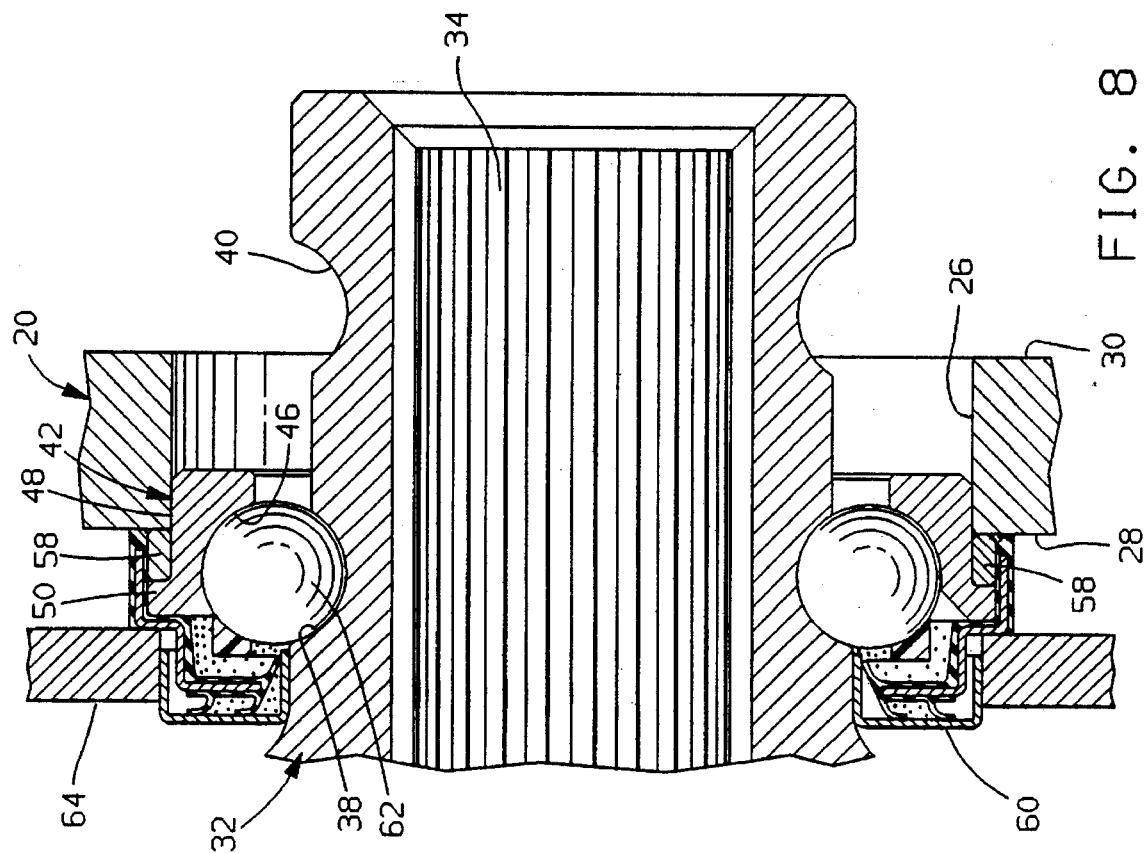
FIG. 8 shows the fourth step.
Figure 7:
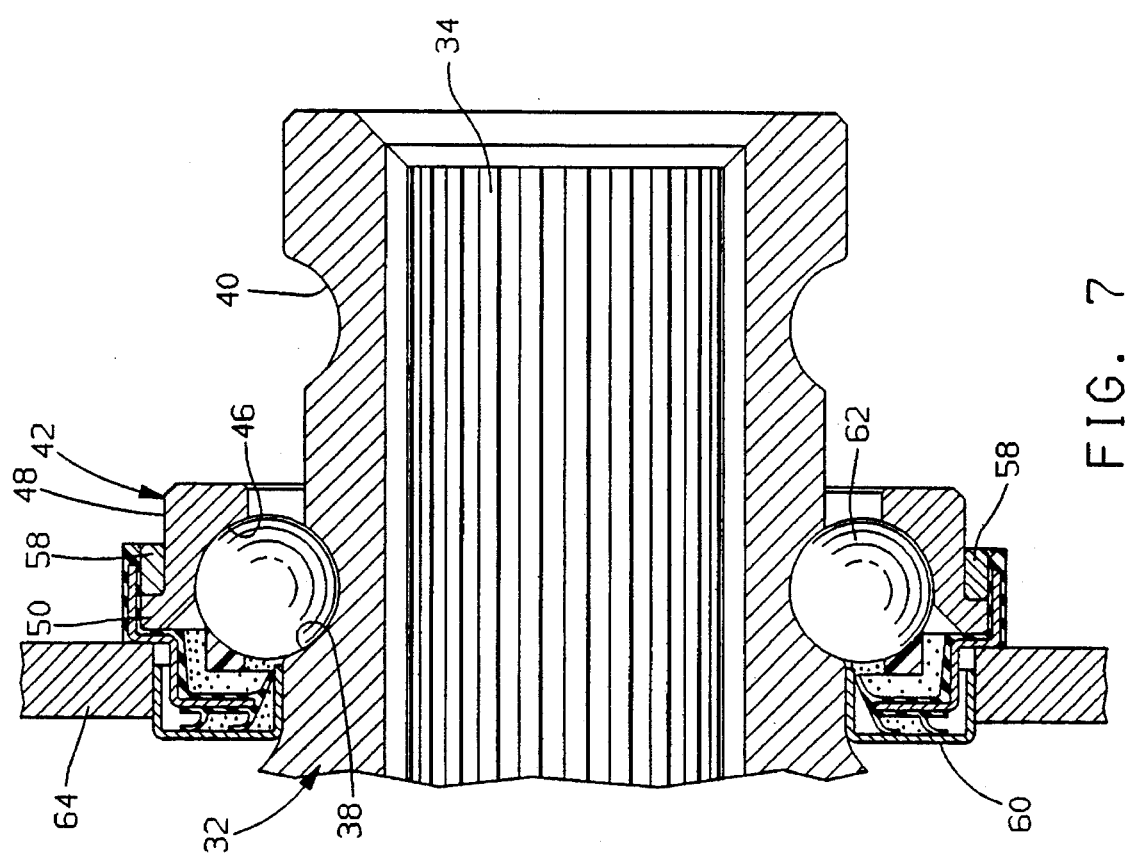
FIG. 7 shows the third step.

Referring next to FIGS. 7 and 8, after support 64 is in place, a pair of control rings 58 is abutted with the shoulder 50 of outboard outer race 42, and pushed inside of the casing of outboard seal 60. Or, the rings 58 could be pushed inside the casing of seal 60 after outboard race 42. Again, the support 64 absorbs the axial force of the insertion. Then, steering knuckle 20 is pushed axially toward outboard race 42, moving opening 26 over race outer surface 48 until outboard annular face 28 abuts shoulder 50, indirectly, through the intermediate control rings 58. Some kind of guide would be used to support steering knuckle 20 as it was inserted over outboard race 42.

Figure 9:
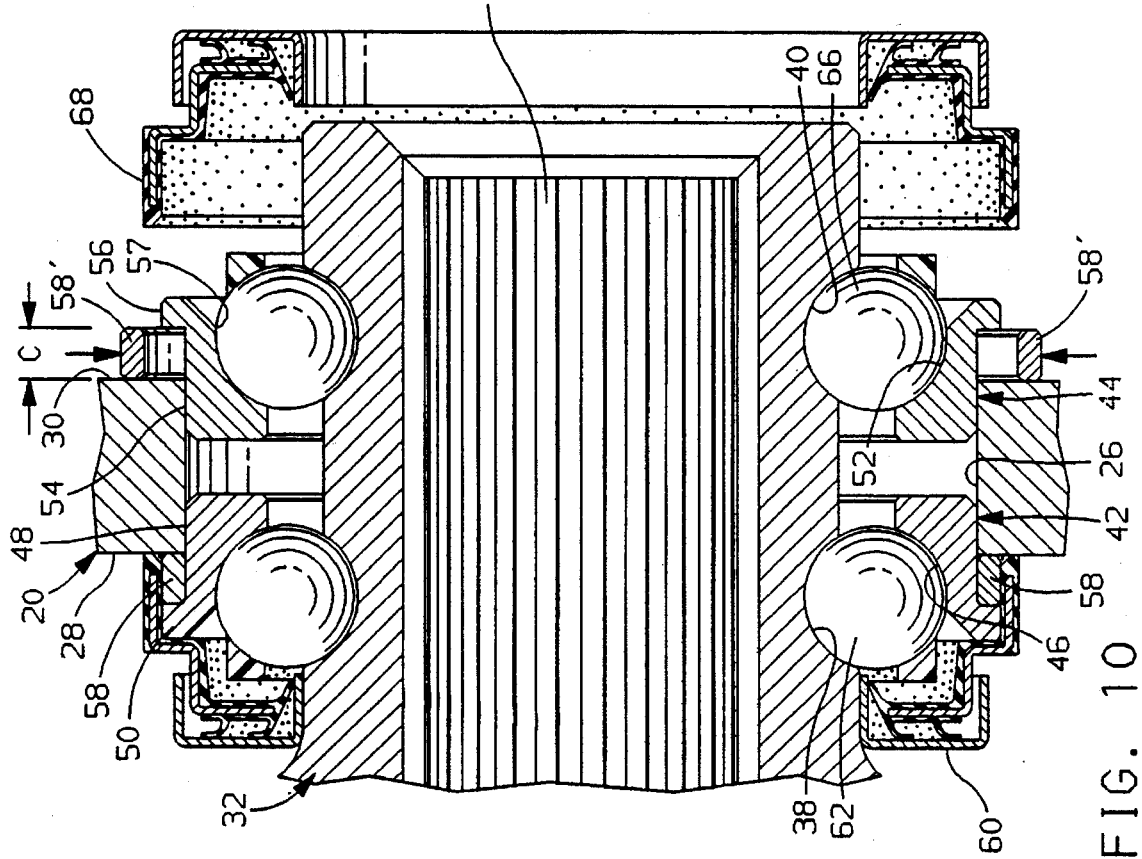
FIG. 9 shows the fifth step.

Referring next to FIG. 9, after knuckle 20 has been installed, the inboard outer race 44 is pressed axially toward knuckle face 30, sliding its outer surface 54 axially into knuckle opening 26 until its shoulder 56 contacts annular face 30. Since G is equal to or greater than C, race 44 will not hit race 42. Concurrently, the terminal edge 57 of inboard outer pathway 52 moves axially back over and beyond the bottom dead center of the inboard inner pathway 40. This is far enough, in fact, more than far enough, to enlarge the clearance between outer race terminal edge 57 and inner pathway 40 to a value $X_A$, termed the assembly clearance, which is larger than a ball diameter B. This assembly clearance, which has both an axial and radial component, is large enough to allow a second, inboard ball row 66 to be dropped in place, from the direction shown. Chamfering edge 57 helps create access for ball placement, while still allowing shoulder 56 to have substantial axial thickness. Then, ball row 66 is spaced out circumferentially and caged.

Figure 10:
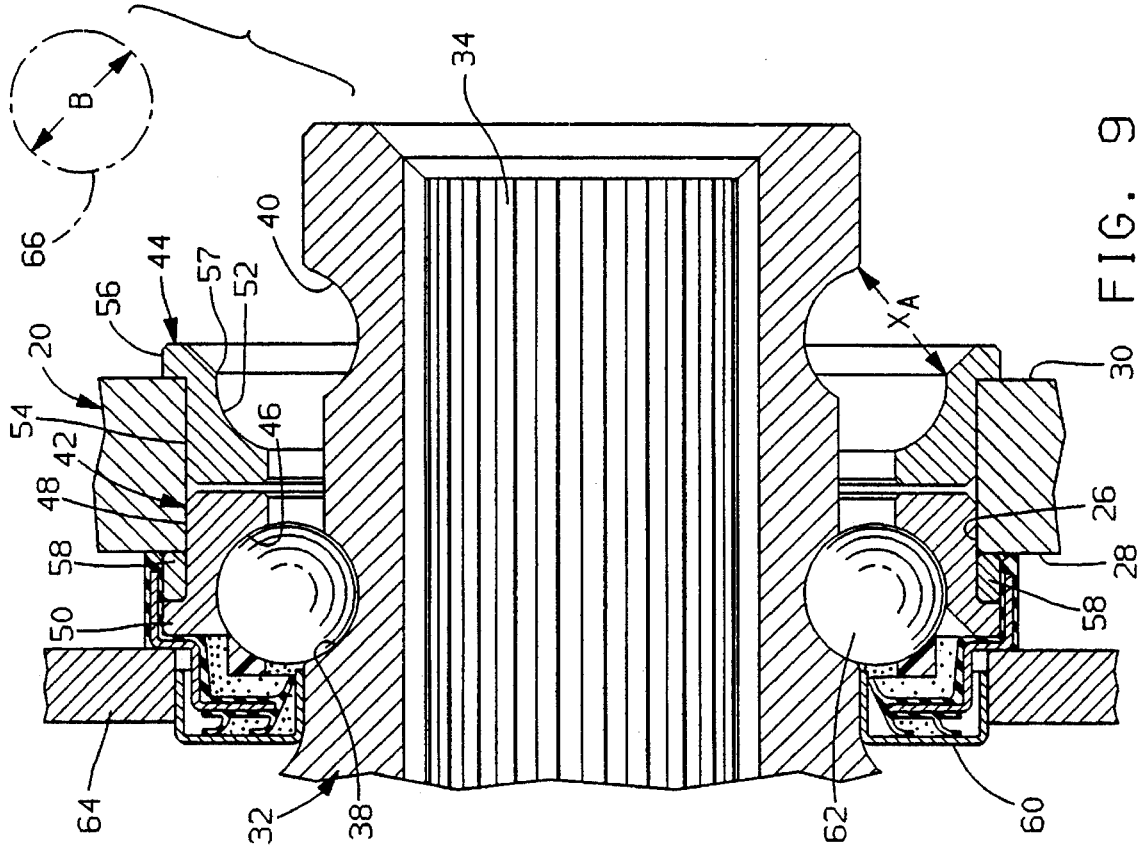
FIG. 10 shows the sixth step.

Referring next to FIG. 10, with inboard ball row 66 in place, the inboard outer race 44 can be pulled axially back out (or up) until its pathway 52 makes rolling contact with the inboard ball row 66, at which point the radial clearance returns to the smaller, original value $X_I$, thereby trapping inboard ball row 66. In addition, the axial clearance C is recreated between shoulder 56 and the steering knuckle inboard annular face 30. Then, the final pair of C-shaped rings, indicated at 58' to differentiate from the first installed control rings 58, is pushed radially inwardly into the clearance C, one from each direction, as shown by the arrows, locking race 44 in place. The fact that most of annular face 30 has been machined smooth eases the insertion of the control rings 58'. As a practical matter, the clearance C would vary over an expected range of values, despite the fact that the annular faces 28 and 30 are accessible and easy to machine. Tolerance stack ups in all the abutting parts and surfaces that go together before the final control rings 58' go in place, namely outboard inner pathway 38, outboard ball row 62, outboard outer pathway 46, outboard outer race shoulder 50, the first installed control rings 58, and outboard annular face 28, all add up to potentially vary the location in space of inboard annular face 30. Furthermore, tolerances in the two inboard pathways 40 and 52, and the inboard ball row 66, add up to vary the location in space of the inboard outer race shoulder 56. So, the axial clearance C in FIG. 10 may vary correspondingly. To account for this, an assortment of control rings 58' of differing thicknesses would be sorted and kept on hand. When the clearance C in FIG. 10 was gauged, the proper thickness of ring 58' would be chosen so as maintain the proper preload across the ball rows 62 and 66. This is in accord with current practice. In a final step, an inboard seal 68 like the outboard seal 60 would be pushed axially over the inboard outer race shoulder 56 and the control rings 58', capturing them radially, just as the casing of the outboard seal 60 does with the control rings 58.

Figure 11:
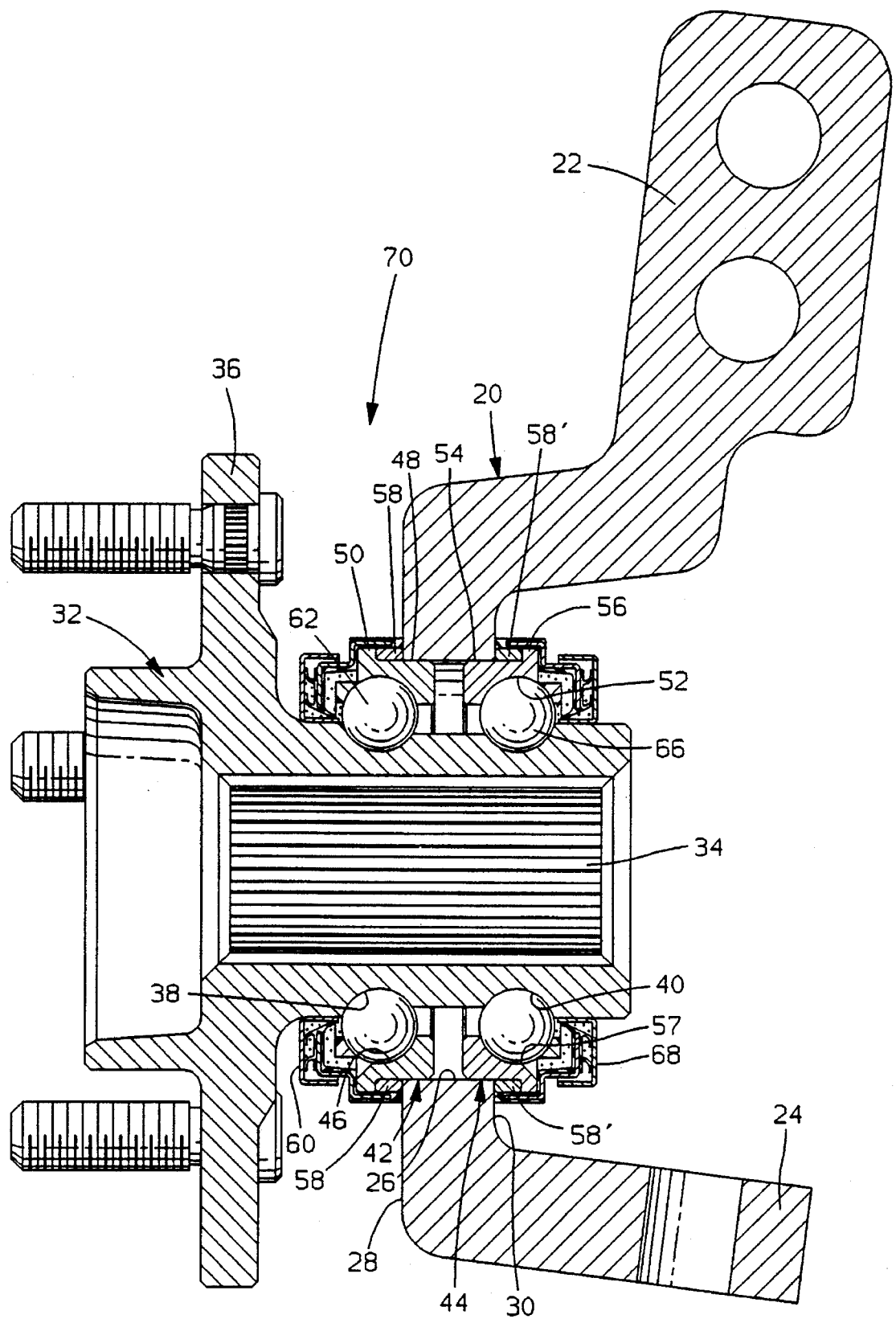
FIG. 11 shows the final step and the completed unit.

Referring finally to FIG. 11, the end result is a combined steering knuckle and wheel bearing assembly, indicated generally at 70. The wheel bearing does not have an integral outer hub per se, but a hub is effectively created by the side by side outer races 42 and 44. The use of bearing steel is minimized in the de facto hub, since it is confined to the outer races 42 and 44 only. The final packaging is also more axially compact than the current, commercially available wheel bearing, in that the ball rows 62 and 66 are located symmetrically to either side of the steering knuckle opening 26. A wider ball row straddle S can thereby be fitted within a given available axial space. Conventionally, a one piece hub would have to be bolted to the steering knuckle outboard face 28, thereby locating both ball rows on the same side, outboard of the steering knuckle, and limiting the ball straddle possible to whatever space was available between the wheel flange 36 and the steering knuckle outboard face 28.

Variations in the disclosed embodiment could be made. The outer races 42 and 44 could be mounted through an opening in a different suspension member, even a rear suspension member, where bolt on wheel bearing units are currently used, like that shown in the Lura patent. In the embodiment disclosed here, the large wheel flange 36 dictates that the inboard race 44 be the last one installed, but that might be reversed in a different application, or there might be access to assemble either outer race first, or even both at once. Here, the control rings 58 used on the first installed outer race 42 serve no assembly function other than to act as filler. If desired, therefore, the outboard outer race shoulder 50 could be made axially thicker, to take the place of the control rings 58 used to thicken it. Furthermore, since the outboard outer race 42 has to be installed first anyway, it could be fixed to the hub 20 by any means, and not necessarily by the same means that by which the inboard outer race 44 is fixed in place. Making the two races 42 and 44 (and the two shoulders 50 and 56) identical is a definite manufacturing and assembly advantage, however. If, for some reason, it was desired to make the balls in the two ball rows of different diameters, so as to take more load on one side of the knuckle 20 than the other, non identical outer races could be made to accommodate. Likewise, if it were desired not to locate the two ball rows exactly symmetrically to either side of steering knuckle opening, then one outer race shoulder or the other could be made thicker, or the control rings used on either side could be varied in thickness. In general, much more flexibility exists for the designer to tailor the desired handling and loading characteristics than with a conventional, bolt on wheel bearing design. It is possible that a one piece control ring, or a control ring of more than two pieces, could be fitted into the axial clearance C, so long as it, or they, had the proper axial thickness. Most generally the control "ring" could be a discrete piece or pieces, and not a circumferentially complete ring, so long as it filled the clearance C properly. If desired, a dedicated swage ring could be formed around the outside of the control rings 58 and 58' to capture them radially, as in the Lura patent referred to above. However, using the seal casings as control ring keepers saves on total component count. Therefore, it will be understood that it is not intended to limit the invention to just the embodiment disclosed.

The embodiments of the invention in which an exclusive property or privilege is claimed are defined as follows:

1. A combined vehicle suspension and wheel bearing assembly, comprising, a suspension member having a cylindrical opening bordered by first and second parallel annular faces, a wheel spindle sized to fit coaxially through said suspension member opening, said spindle having first and second inner bearing ball pathways thereon, first and second rows of bearing balls in rolling contact with said first and second inner bearing ball pathways respectively, a first outer bearing race secured to said first annular face and having an angular contact ball pathway in rolling contact with said first row of bearing balls, a second outer bearing race having an angular contact ball pathway sized to make rolling contact with said second ball row, when in a fully installed position, with a radial clearance from said second inner pathway less than the diameter of said second row of bearing balls, said second outer bearing race also having a cylindrical outer surface slidably receivable within said suspension member opening with a predetermined axial clearance therefrom sufficiently large to allow said second outer bearing race to be pushed back into said suspension member opening and move said second outer bearing race pathway axially over said second inner ball pathway sufficiently far to an assembly position in which said second outer bearing race ball pathway has an effective clearance from said second inner ball pathway large enough to admit said second row of bearing balls, and, a control ring having a diameter substantially equal to said second race shoulder and a thickness substantially equal to said predetermined axial clearance, whereby said first row of bearing balls and first outer race can be installed first, after which said second outer bearing race may be moved to its assembly position, allowing said second row of bearing balls to be installed, after which said second outer bearing race may be moved axially back to its fully installed position and said control ring fitted between said second race shoulder and second annular face to maintain said second race in its fully installed position.

2. A combined vehicle suspension and wheel bearing assembly, comprising, a suspension member having a cylindrical opening bordered by first and second parallel annular faces, a wheel spindle sized to fit coaxially through said suspension member opening, said spindle having first and second inner bearing ball pathways thereon, a pair of rows of bearing balls of identical diameter, first and second identical outer bearing races, each having an angular contact ball pathway sized to make rolling contact with a row of said bearing balls, when in a fully installed position, with a radial clearance from a respective first and second inner pathway that is less than the diameter of said rows of bearing balls, said outer races each also having a cylindrical outer surface slidably receivable within said suspension member opening and a shoulder adapted to abut a respective first and second annular suspension member face with a predetermined axial clearance therefrom sufficiently large to allow either of said outer bearing races to be retracted axially into said suspension member opening and move a respective outer race pathway axially over its respective inner ball pathway sufficiently far to an assembly position in which said retracted outer race ball pathway has an effective clearance from its respective inner ball pathway large enough to admit a row of bearing balls, control rings having a diameter substantially equal to said outer race shoulders and a thickness substantially equal to said predetermined axial clearance, whereby either of said outer races can be first abutted with one of said control rings and its respective suspension member annular face and one of said pairs of rows of bearing balls installed between said outer race and the inner pathway respective to said outer race, after which the remaining outer race may be retracted to its assembly position, allowing the remaining row of bearing balls to be installed, after which said retracted outer race can be moved axially back to its fully installed position and the remaining control ring fitted between the shoulder of said retracted outer race and the other annular face to maintain said outer race in its fully installed position.

3. A combined vehicle steering knuckle and wheel bearing assembly, comprising, a cylindrical central opening in said steering knuckle bordered by unobstructed first and second parallel annular faces, a wheel spindle sized to fit coaxially through said steering knuckle opening, said spindle having first and second inner bearing ball pathways thereon with an axial separation greater than said first and second annular faces, a pair of rows of bearing balls of identical diameter, first and second identical outer bearing races, each having an angular contact ball pathway sized to make rolling contact with a row of said bearing balls, when in a fully installed position, with a radial clearance from a respective first and second inner pathway that is less than the diameter of said rows of bearing balls, said outer races each also having a cylindrical outer surface slidably receivable within said knuckle opening and a shoulder adapted to abut a respective first and second annular steering knuckle face with a predetermined axial clearance therefrom sufficiently large to allow either of said outer bearing races to be retracted axially into said knuckle opening and move said outer race pathway axially over its respective inner ball pathway sufficiently far to an assembly position in which said retracted outer race ball pathway has an effective clearance from its respective inner ball pathway large enough to admit a row of bearing balls, four generally C shaped control rings having a diameter substantially equal to said outer race shoulders and a thickness substantially equal to said predetermined axial clearance, whereby either of said outer races can be first abutted with a pair of said control rings and its respective steering knuckle annular face and one of said pairs of rows of bearing balls installed between said outer race and its respective inner pathway, after which the remaining outer race may be retracted to its assembly position, allowing the remaining row of bearing balls to be installed, after which said retracted outer race may be moved axially back to its fully installed position and the remaining pair of control rings fitted between shoulder of said retracted outer race and the other annular face to maintain said outer race in its fully installed position.

\* \* \* \* \*